United States Patent
Hassanein et al.

(10) Patent No.: US 8,121,950 B2
(45) Date of Patent: Feb. 21, 2012

(54) METHOD OF PROCESSING A CHECK AND AN APPARATUS THEREFOR

(75) Inventors: Khaled S. Hassanein, Waterloo (CA); Geoffrey G. Marlow, Kitchener (CA)

(73) Assignee: NCR Corporation, Duluth, GA (US)

( * ) Notice: Subject to any disclaimer, the term of this patent is extended or adjusted under 35 U.S.C. 154(b) by 2027 days.

(21) Appl. No.: 10/979,392

(22) Filed: Nov. 2, 2004

(65) Prior Publication Data

US 2005/0097048 A1    May 5, 2005

Related U.S. Application Data

(63) Continuation of application No. 09/444,685, filed on Nov. 22, 1999, now Pat. No. 6,845,366.

(51) Int. Cl.
*G06Q 40/00* (2006.01)

(52) U.S. Cl. ............... 705/45; 705/34; 705/39; 705/40; 705/42; 705/43

(58) Field of Classification Search ............ 705/34, 705/39, 40, 42, 43, 45
See application file for complete search history.

(56) References Cited

U.S. PATENT DOCUMENTS

| | | | |
|---|---|---|---|
| 4,813,077 A | 3/1989 | Woods et al. | |
| 4,933,536 A | 6/1990 | Lindemann et al. | |
| 4,965,763 A | 10/1990 | Zamora | |
| 5,040,226 A | 8/1991 | Elischer et al. | |
| 5,121,945 A * | 6/1992 | Thomson et al. | 283/58 |
| 5,140,650 A | 8/1992 | Casey et al. | |
| 5,191,525 A | 3/1993 | LeBrun et al. | |
| 5,237,159 A | 8/1993 | Stephens et al. | |
| 5,285,384 A | 2/1994 | Gineris | |
| 5,433,483 A | 7/1995 | Yu | |
| 5,631,984 A | 5/1997 | Graf et al. | |
| 5,691,524 A | 11/1997 | Josephson | |
| 5,783,808 A * | 7/1998 | Josephson | 235/379 |
| 5,819,291 A | 10/1998 | Haimowitz et al. | |
| 5,832,464 A | 11/1998 | Houvener et al. | |
| 5,870,725 A | 2/1999 | Bellinger et al. | |
| 5,890,141 A * | 3/1999 | Carney et al. | 705/45 |
| 5,895,455 A | 4/1999 | Bellinger et al. | |
| 5,940,844 A | 8/1999 | Cahill et al. | |
| 5,956,700 A | 9/1999 | Landry | |
| 6,032,137 A | 2/2000 | Ballard | |
| 6,070,141 A | 5/2000 | Houvener et al. | |

(Continued)

FOREIGN PATENT DOCUMENTS

GB    2 159 644 A    12/1985

OTHER PUBLICATIONS

"Easi-Order" ComputerWorld v 34 n12 pp. 46-48 Mar. 20, 2000.

*Primary Examiner* — Nga B. Nguyen
(74) *Attorney, Agent, or Firm* — Michael Chan

(57) ABSTRACT

A device captures an image of a check having a payee and/or a payor field. Payee data and/or payor data contained in the payee field and/or the payor field is extracted from the captured image. Extracted payee data and/or extracted payor data is stored in a data warehouse to allow a user to generate business-related information based upon the extracted payee data and/or the extracted payor data.

1 Claim, 7 Drawing Sheets

U.S. PATENT DOCUMENTS

| | | | |
|---|---|---|---|
| 6,073,121 A | 6/2000 | Ramzy | |
| 6,112,191 A | 8/2000 | Burke | |
| 6,181,837 B1 | 1/2001 | Cahill et al. | |
| 6,189,785 B1 * | 2/2001 | Lowery | 235/379 |
| 6,243,689 B1 | 6/2001 | Norton | |
| 6,301,379 B1 | 10/2001 | Thompson et al. | |
| 6,317,745 B1 | 11/2001 | Thomas et al. | |
| 6,338,049 B1 | 1/2002 | Walker et al. | |
| 6,363,162 B1 | 3/2002 | Moed et al. | |
| 6,363,362 B1 * | 3/2002 | Burfield et al. | 705/40 |
| 6,366,956 B1 | 4/2002 | Krishnan | |
| 6,370,266 B1 | 4/2002 | Lau et al. | |
| 6,384,844 B1 | 5/2002 | Stewart et al. | |
| 6,390,362 B1 | 5/2002 | Martin | |
| 6,431,439 B1 | 8/2002 | Suer et al. | |
| 6,574,377 B1 | 6/2003 | Cahill et al. | |
| 6,611,598 B1 | 8/2003 | Hayosh | |
| 6,683,697 B1 | 1/2004 | Lech et al. | |
| 6,845,366 B1 * | 1/2005 | Hassanein et al. | 705/45 |

\* cited by examiner

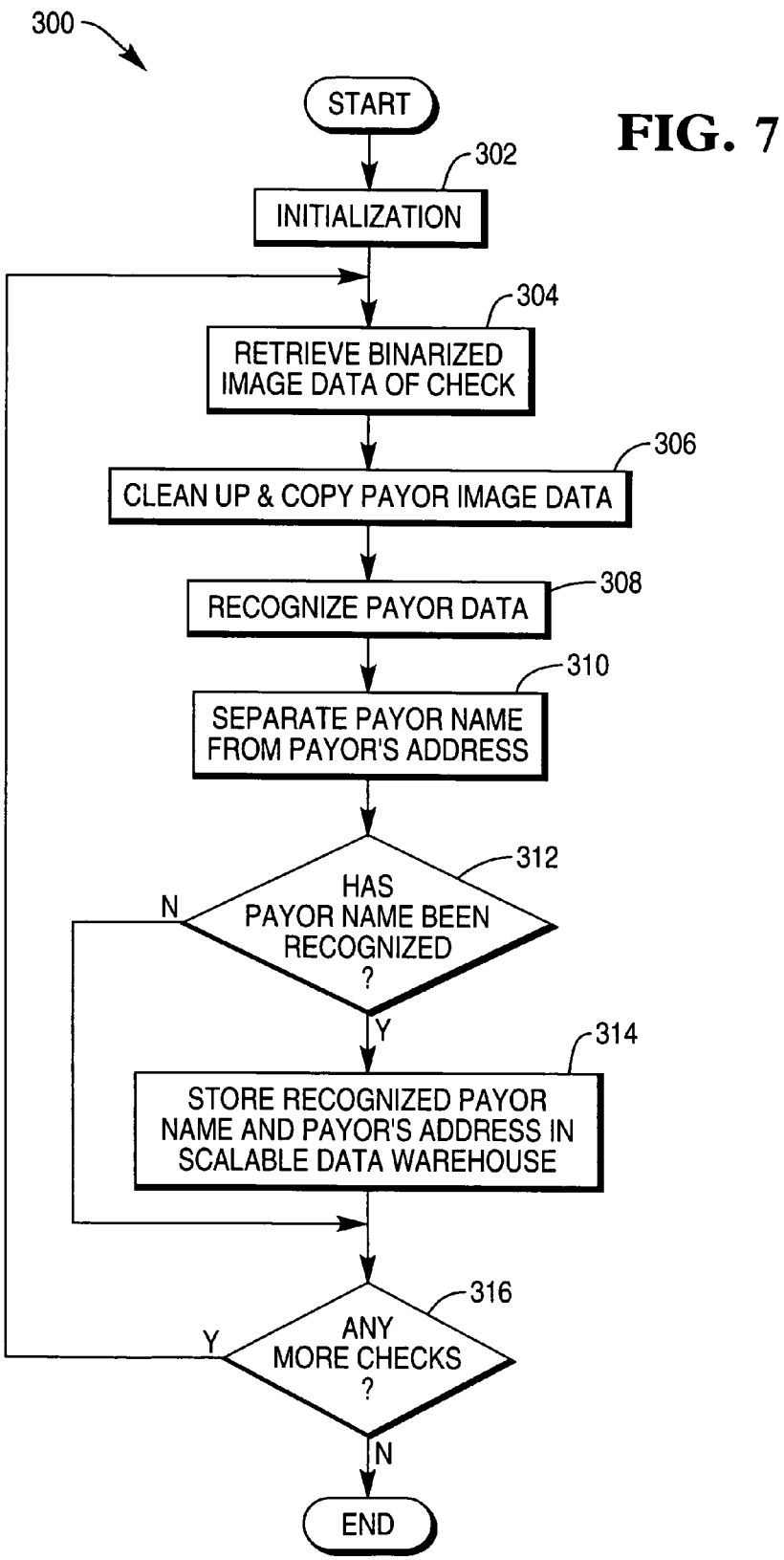

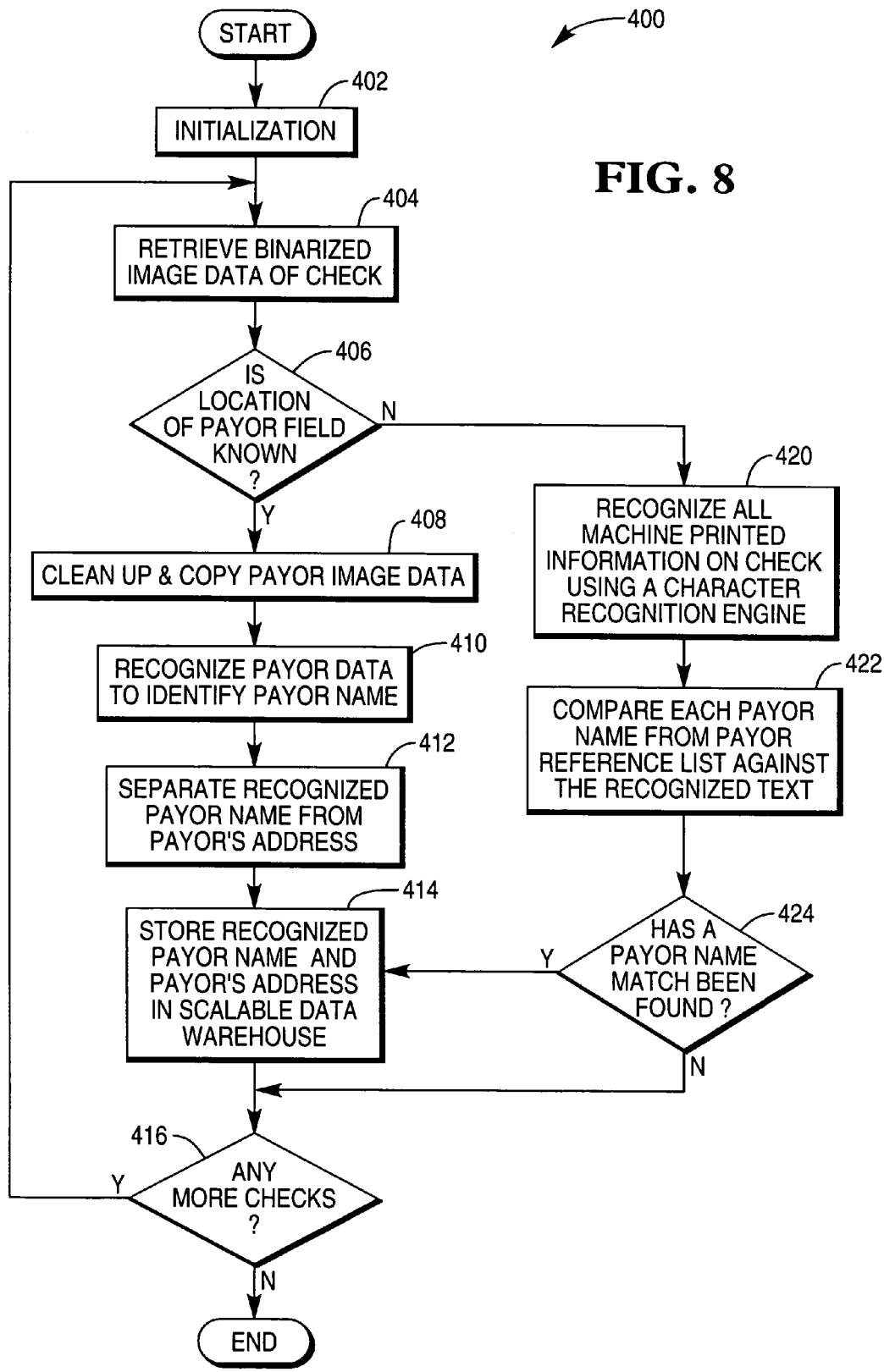

METHOD OF PROCESSING A CHECK AND AN APPARATUS THEREFOR

This application is a continuation of application Ser. No. 09/444,685, filed Nov. 22, 1999 now U.S. Pat. No. 6,845,366.

BACKGROUND OF THE INVENTION

The present invention relates to check processing, and is particularly directed to a method of processing a check and an apparatus therefor.

A typical check has a number of fields including a courtesy amount field, a legal amount field, a payor field, a payee field, a date field, and a signature field. The check may be of the personal type or of the business type. A known way to extract data from the check is to use a combination of image processing techniques and recognition techniques. The check is typically moved past an image processing device such as a scanner to obtain a digitized image of the check. The digitized image of the check is then stored in memory.

Data contained in the courtesy amount field and/or data contained in the legal amount field are usually recognized from the digitized image of the check. More specifically, characters contained in the courtesy amount field and/or the legal amount field are located prior to being subjected to a handwriting and/or character recognition engine at a subsequent operation. The recognition engine applies recognition techniques to the located character to establish the amount of the check. It would be desirable to recognize data from other fields of the check to provide other useful information.

SUMMARY OF THE INVENTION

In accordance with one aspect of the present invention, a method of processing a check comprises the steps of (a) capturing an image of a check having a payee field, (b) extracting payee data contained in the payee field from the captured image of step (a), and (c) storing the extracted payee data of step (b) in a data warehouse to allow a user to generate business-related information based upon the extracted payee data. Preferably, step (b) includes the step of (b-1) comparing extracted payee data with reference payee data to determine if a payee name from the extracted payee data and a payee name from the reference payee data match, and step (c) includes the step of (c-1) storing the payee name in the data warehouse when a payee name match is found based upon the comparison of step (b-1).

In accordance with another aspect of the present invention, a method of processing a check comprises the steps of (a) capturing an image of a check having a payor field, (b) extracting payor data contained in the payor field from the captured image of step (a), and (c) storing the extracted payor data of step (b) in a data warehouse to allow a user to generate business-related information based upon the extracted payor data. Preferably, step (b) includes the step of (b-1) comparing extracted payor data with reference payor data to determine if a payor name from the extracted payor data and a payor name from the reference payor data match, and step (c) includes the step of (c-1) storing the payor name in the data warehouse when a payor name match is found based upon the comparison of step (b-1).

In accordance with still another aspect of the present invention, an apparatus is provided for processing a check. The apparatus comprises a device for capturing an image of a check having a payee field. The apparatus further comprises means for extracting payee data contained in the payee field from the captured image. A data warehouse is provided for storing extracted payee data to allow a user to generate business-related information based upon the extracted payee data. Preferably, the extracting means includes means for comparing extracted payor data with reference payor data to determine if a payor name from the extracted payor data and a payor name from the reference payor data match. The payor name is stored in the data warehouse when a payor name match is found based upon the comparison of the extracted payor data and the reference payor data.

In accordance with yet another aspect of the present invention, an apparatus is provided for processing a check. The apparatus comprises a device for capturing an image of a check having a payor field. The apparatus further comprises means for extracting payor data contained in the payor field from the captured image. A data warehouse is provided for storing extracted payor data to allow a user to generate business-related information based upon the extracted payor data. Preferably, the extracting means includes means for comparing extracted payor data with reference payor data to determine if a payor name from the extracted payor data and a payor name from the reference payor data match. The payor name is stored in the data warehouse when a payor name match is found based upon the comparison of the extracted payor data and the reference payor data.

BRIEF DESCRIPTION OF THE DRAWING

The foregoing and other features of the present invention will become apparent to one skilled in the art to which the present invention relates upon consideration of the following description of the invention with reference to the accompanying drawings, wherein:

FIG. 7 is a flowchart depicting another program for processing check image data associated with a personal check in accordance with the present invention; and FIG. 8 is a flowchart depicting another program for processing check image data associated with a business check in accordance with the present invention.

DETAILS OF THE INVENTION

The present invention is directed to a method of processing a check and an apparatus therefor. The check may be of any type, such as a check of the personal type or a check of the business type.

Figure 1:
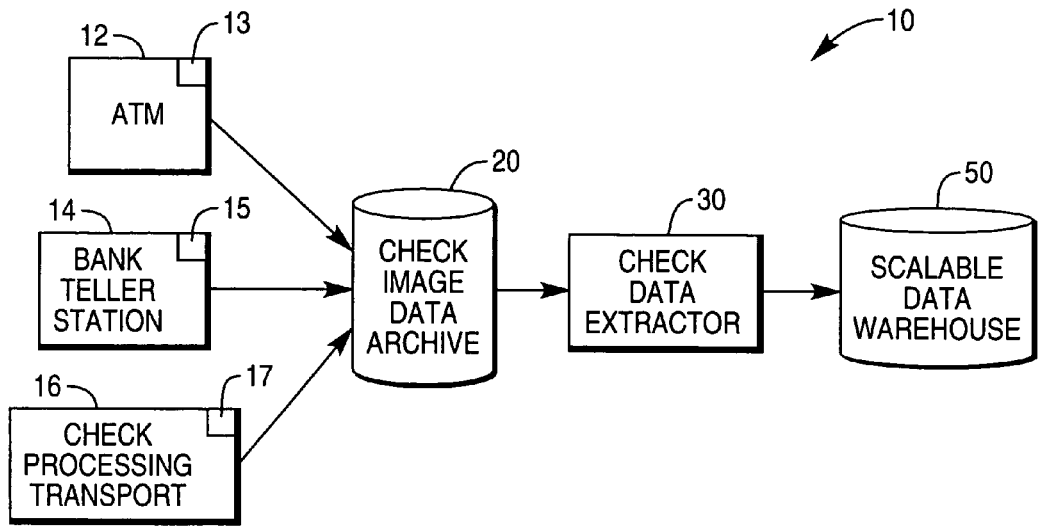
FIG. 1 is a block diagram representation of an image-based check processing system which embodies the present invention.

Referring to FIG. 1, an image-based check processing system 10 includes a number of check processing terminals, such as an automated teller machine (ATM) 12, a bank teller station 14, and/or a check processing transport 16, at which images of checks may be captured. The terminals 12, 14, 16 include respective image capture devices 13, 15, 17. Each of the image capture devices 13, 15, 17 may comprise a scanner which lifts an image of a check as the check moves past the scanner. More specifically, the scanner produces pixels each pixel having a particular gray level associated therewith. The gray level of each pixel is thresholded in a known manner and then stored as binarized image data in a check image data archive 20 as shown in FIG. 1. Accordingly, check image data associated with a particular check is initially captured at the ATM 12, the bank teller station 14, or the check processing transport 16 and is then processed to provide binarized image data which is stored in the check image data archive 20. The binarized image data associated with all of the pixels form a binarized image of the particular check.

Scanners for lifting images of checks at the terminals 12, 14, 16 are readily available in the marketplace. Their structure and operation are well known and, therefore, will not be described. Moreover, the process of capturing an image of a check and storing the check image as binarized image data in the check image data archive 20 is known and, therefore, will not be described.

Other available data relating to a particular check transaction may also be stored in the check image archive 20. Such available data may include time and date of when the particular transaction occurred. In the case of an ATM transaction, such available data may include identity of the person using an ATM card to carry out the transaction at the ATM.

Although the above description describes obtaining binarized image data to form a binarized image of the particular check, it is contemplated that gray scale image data may be obtained to form a gray scale image of the particular check. Alternatively, color image data may be obtained to form a color image of the particular check. Any of these types of check images may be processed in accordance with the present invention. For simplicity, only binarized images of checks will be discussed hereinafter.

Figure 2:
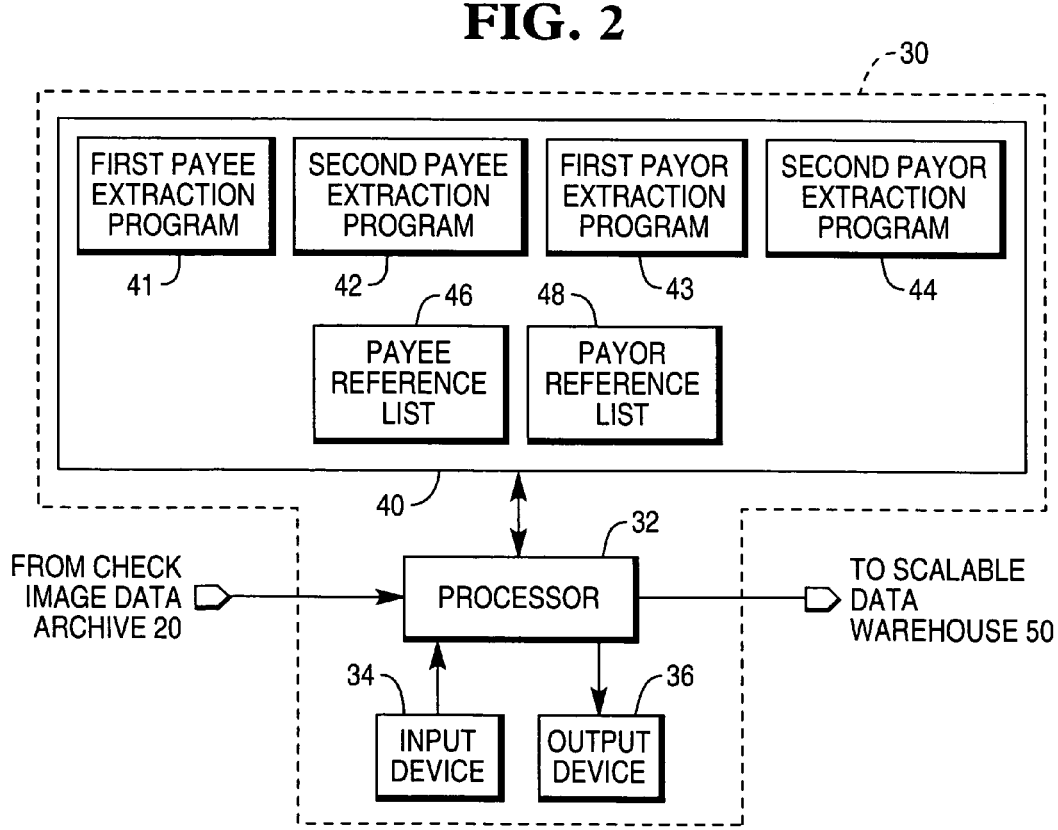
FIG. 2 is an enlarged portion of the block diagram of FIG. 1.

Referring to FIGS. 1 and 2, a check data extractor 30 includes a processor 32 which retrieves check image data from the archive 20, processes the retrieved data, and then stores the processed data in a scalable data warehouse 50. Preferably, the processor 32 includes a microcomputer, and the scalable data warehouse 50 includes non-volatile storage memories such as hard disk drives, for example. Suitable microcomputers and memories are readily available in the marketplace. Their structure and operation are well known and, therefore, will not be described.

The check data extractor 30 further includes an input device 34 and an output device 36 which allows a user to control operation of the processor 32 and thereby to control processing of check image data stored in the archive 20 to provide useful extracted data such as extracted payor data and extracted payee data. The useful extracted data is stored in the scalable data warehouse 50. The input device 34 may include a keyboard, a mouse, or a touch-sensitive screen, for examples. The output device 36 may include a CRT display, or a liquid crystal display, for examples.

The check data extractor 30 further includes a system memory 40 which stores, inter alia, a number of application programs including a first payee data extraction program 41, a second payee data extraction program 42, a first payor data extraction program 43, and/or a second payor data extraction program 44. The system memory 40 also stores a payee reference list 46 and a payor reference list 48. The payee reference list 46 contains a set of user-defined payee names which are of particular interest to the user. The set of payee names contained in the payee reference list 46 may be changed by the user at any time. The payor reference list 48 contains a set of user-defined payor names which are of particular interest to the user. The set of payor names contained in the payor reference list 48 may be changed by the user at any time.

Figure 3:
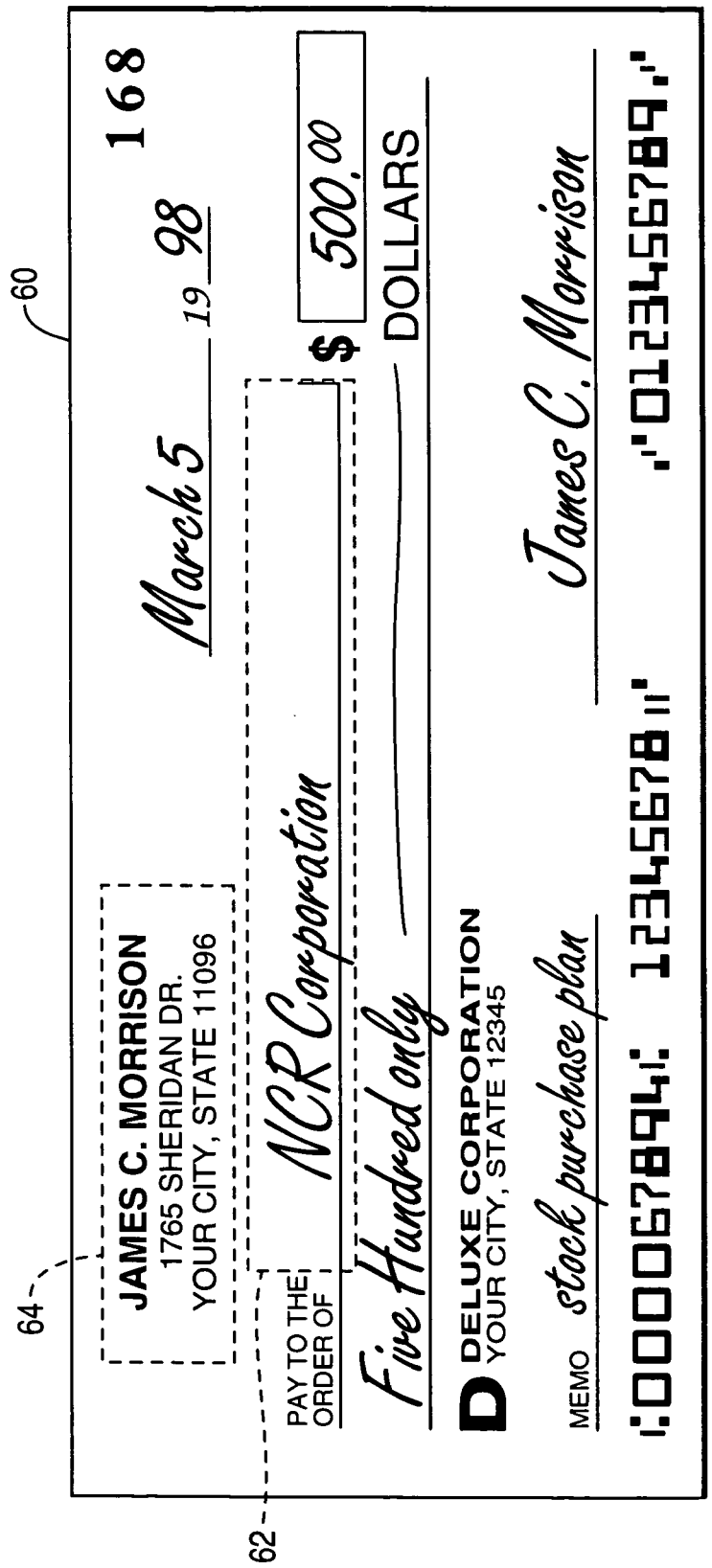
FIG. 3 is an image of a typical personal check which may be processed in accordance with the present invention.
Figure 4:
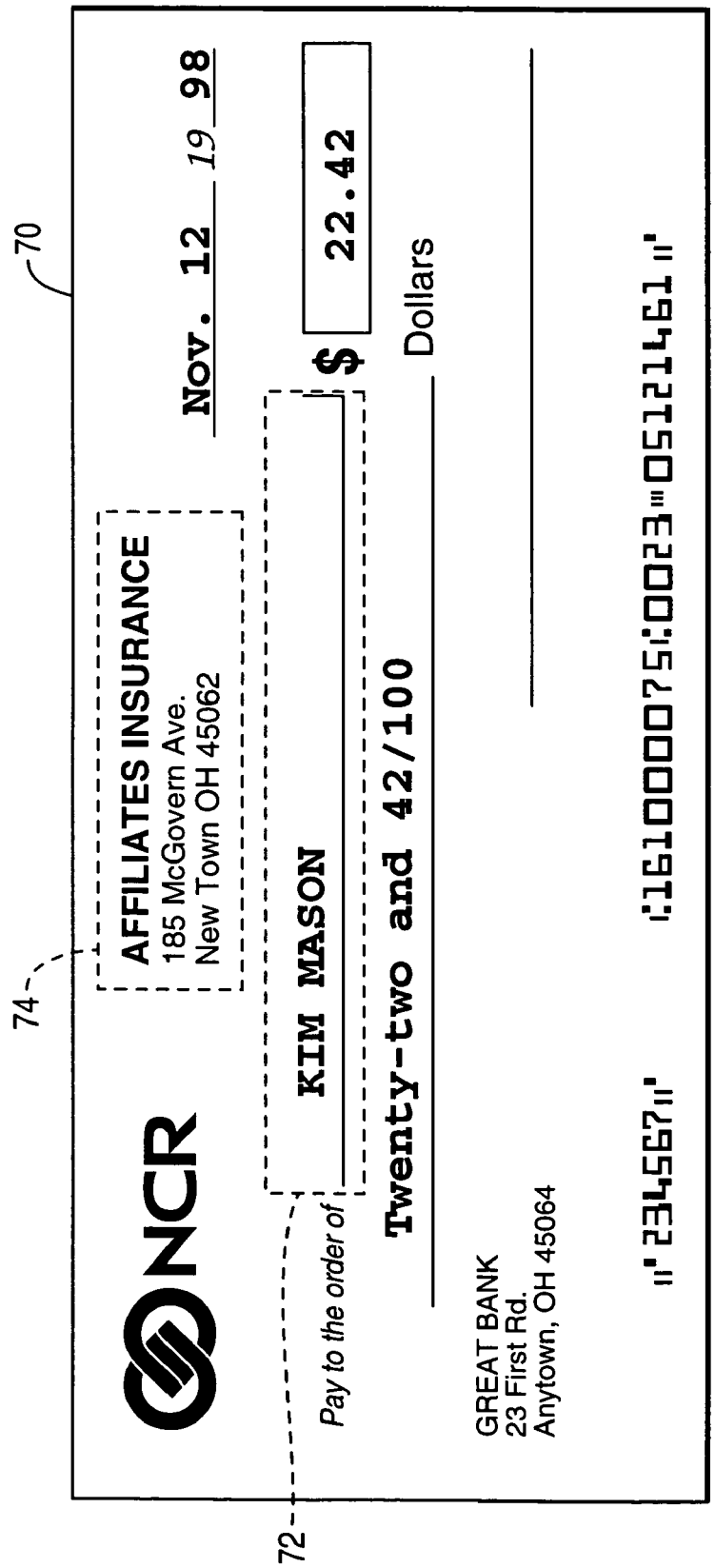
FIG. 4 is an image of a typical business check which may be processed in accordance with the present invention.

Different types of checks may be processed to provide useful extracted data in accordance with the present invention. As an example, a personal check 60 having a payee field 62 and a payor field 64, as shown in FIG. 3, may be processed to extract payee and/or payor data. Alternatively, a business check 70 having a payee field 72 and a payor field 74, as shown in FIG. 4, may be processed to extract payee and/or payor data. Extracted data is stored in the scalable data warehouse 50 to allow a user to generate business-related information based upon the extracted data. The business-related information may include marketing-related information useful for marketing purposes.

Figure 5:
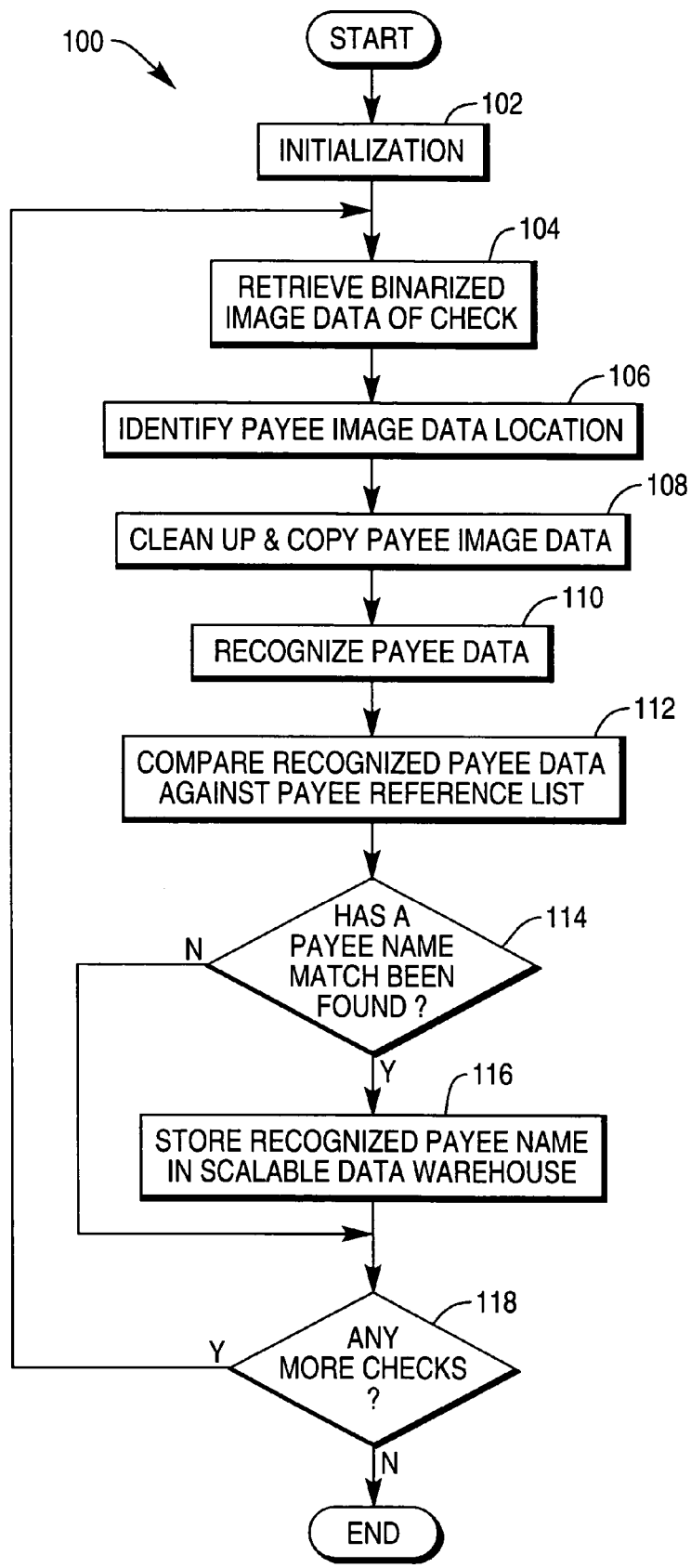
FIG. 5 is a flowchart depicting a program for processing check image data associated with a personal check in accordance with the present invention.

Referring to FIG. 5, a flowchart 100 depicts steps of the first payee extraction program 41 for processing check image data associated with a personal check in accordance with the present invention. After program initialization as shown in step 102, the program proceeds to step 104 in which binarized image data associated with a check is retrieved from the check image archive 20. The program then proceeds to step 106 in which the exact location of the payee image data contained in the payee field is identified for further processing.

After the location of the payee image data contained in the payee field has been identified in step 106, the program proceeds to step 108 in which the payee image data contained in the payee field is cleaned up using known image processing techniques and copied into memory for further processing. Cleaning up of the payee image data contained in the payee field may include removal of background noise and/or interfering strokes from adjacent fields. The program then proceeds to step 110 in which the payee image data associated with the check is subjected to a handwriting recognition engine to establish the name of the payee. There are many handwriting recognition engines available in the marketplace which can be used to establish the name of the payee associated with the check and, therefore, will not be described. Then, in steps 112 and 114, the recognized payee name from step 110 is compared with the payee names contained in the payee reference list 46 to determine if there is a match. If the determination in step 114 is negative, the program proceeds directly to step 118. However, if the determination in step 114 is affirmative, the program proceeds to step 116 in which the recognized payee name associated with the check is stored in the scalable data warehouse 50. The program then proceeds to step 118 in which a determination is made as to whether there are more checks to be processed. If the determination in step 118 is affirmative, the program returns to step 104 to retrieve binarized image data associated with the next check. Otherwise, the program terminates.

Figure 6:
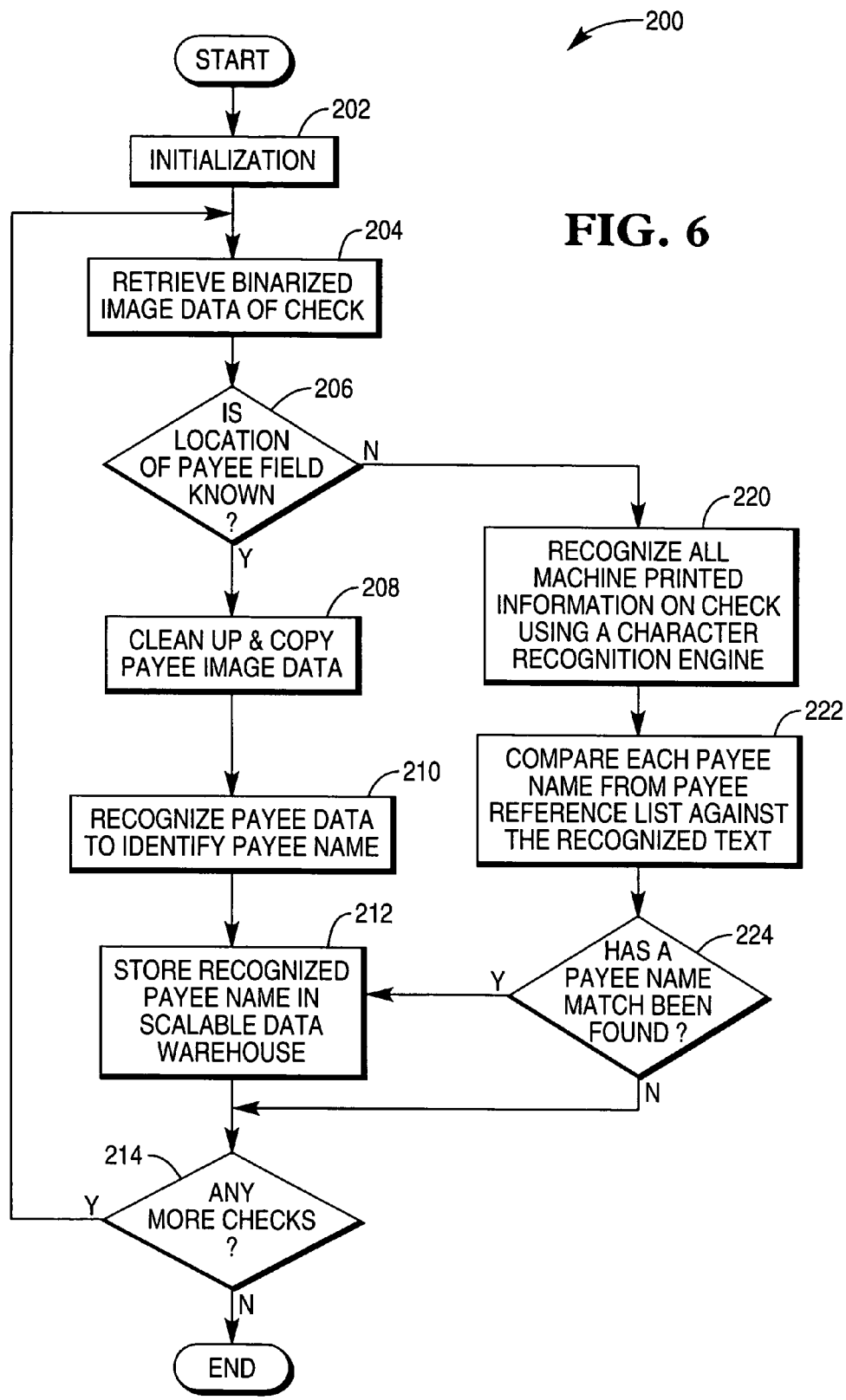
FIG. 6 is a flowchart depicting a program for processing check image data associated with a business check in accordance with the present invention.

Referring to FIG. 6, a flowchart 200 depicts steps of the second payee extraction program 42 for processing check image data associated with a business check in accordance with the present invention. After program initialization as shown in step 202, the program proceeds to step 204 in which binarized image data associated with a check is retrieved from the check image archive 20. The program then proceeds to step 206 in which a determination is made as to whether or not the location of the payee field which contains payee data is known. If the determination in step 206 is affirmative, the program proceeds to step 208 in which image data associated with the payee field is copied into memory for further processing. The program proceeds to step 210 in which the payee data associated with the check is subjected to a character recognition engine to establish the name of the payee. There are many character recognition engines available in the marketplace which can be used to establish the name of the payee associated with the check and, therefore, will not be described. Then, as shown in step 212, the recognized payee name associated with the check is stored in the scalable data warehouse 50.

However, if the location of the payee field which contains payee data is not known, as determined in step 206, then the program proceeds to step 220. In step 220, all machine-printed information on the check is recognized using a known character recognition engine. Then, in steps 222 and 224, the recognized payee name from step 220 is compared with the payee names contained in the payee reference list 46 to determine if there is a match. If the determination in step 224 is negative, the program proceeds directly to step 214. However, if the determination in step 224 is affirmative, the program proceeds to step 212 in which the recognized payee name associated with the check is stored in the scalable data warehouse 50. The program then proceeds to step 214 in which a determination is made as to whether there are more checks to be processed. If the determination in step 214 is affirmative, the program returns to step 204 to retrieve binarized image data associated with the next check. Otherwise, the program terminates.

It should be apparent that each of the first and second payee extraction programs 41, 42 processes binarized image data stored in the check image data archive 20 to provide useful extracted payee data which is eventually stored in the scalable data warehouse 50. Accordingly, the scalable data warehouse 50 stores particular payee data which has been extracted from a number of checks. Other available data relating to a particular check transaction may also be retrieved from the check image archive 20 and also eventually stored in the scalable data warehouse 50. As previously mentioned, such available data may include time and date of the particular transaction and, in the case of an ATM transaction, identity of the person using an ATM card to carry out the transaction at the ATM 12.

A bank may use the extracted payee data stored in the scalable data warehouse 50 in many different ways. By knowing who their customers write checks to, the bank may identify new marketing opportunities with particular customers and provide customized marketing directed to each of the customers depending upon the new marketing opportunities which have been identified. Also, by knowing who their customers write checks to, the bank is able to provide better services to their customers. For example, the bank could provide a customized bank statement to a particular customer when different checks written by that customer during a given time period of time are broken down by expenditure categories such as utilities, food, medical, etc.

The bank could also use the extracted payee data stored in the scalable data warehouse 50 to identify that many of its customers write checks to a certain merchant who is also a customer of the bank. This could lead to joint marketing efforts between the bank and that merchant in targeting the particular group of customers. Still further, the bank could use the extracted payee data stored in the scalable data warehouse 50 to identify their major competitors in certain areas.

Referring to FIG. 7, a flowchart 300 depicts steps of the first payor extraction program 43 for processing check image data associated with a personal check in accordance with the present invention. After program initialization as shown in step 302, the program proceeds to step 304 in which binarized image data associated with a check is retrieved from the check image archive 20. The program then proceeds to step 306 in which only the image data associated with the payor field is cleaned up using known image processing techniques and copied into memory for further processing.

After the image data associated with the payor field has been copied into memory in step 306, the program proceeds to step 308 in which payor data associated with the check is subjected to a character recognition engine to establish the name of the payor and the address of the payor. There are many character recognition engines available in the marketplace which can be used to establish the name of the payor and the address of the payor associated with the check and, therefore, will not be described. The recognition results obtained in step 308 are then parsed in a known manner to separate the name of the payor from the address of the payor for the check, as shown in step 310. The address of the payor may include a home address, a telephone number, or a facsimile number.

Then, in step 312, a determination is made as to whether or not the name of the payor has been recognized in step 308. If the determination in step 312 is negative, the program proceeds directly to step 316. However, if the determination in step 312 is affirmative, the program proceeds to step 314 in which the recognized payor name and the recognized payor address associated with the check are stored in the scalable data warehouse 50. The program then proceeds to step 316 in which a determination is made as to whether there are more checks to be processed. If the determination in step 316 is affirmative, the program returns to step 304 to retrieve binarized image data associated with the next check. Otherwise, the program terminates.

Referring to FIG. 8, a flowchart 400 depicts steps of the second payor extraction program 44 for processing check image data associated with a business check in accordance with the present invention. After program initialization as shown in step 402, the program proceeds to step 404 in which binarized image data associated with a check is retrieved from the check image archive 20. The program then proceeds to step 406 in which a determination is made as to whether or not the location of the payor field which contains payor data is known. If the determination in step 406 is affirmative, the program proceeds to step 408 in which image data associated with the payor field is copied into memory for further processing. The program proceeds to step 410 in which the image data associated with the payor field is subjected to a character recognition engine to establish the name of the payor. There are many character recognition engines available in the marketplace which can be used to establish the name of the payor associated with the check and, therefore, will not be described. The recognition results obtained in step 410 are then parsed in a known manner to separate the name of the payor from the address of the payor for the check, as shown in step 412. Then, as shown in step 414, the recognized payor name and the recognized payor address associated with the check are stored in the scalable data warehouse 50.

However, if the location of the payor field which contains payor data is not known, as determined in step 406, then the program proceeds to step 420. In step 420, all machine-printed information on the check is recognized using a known character recognition engine. Then, in steps 422 and 424, the recognized payor name from step 420 is compared with the payor names contained in the payor reference list 48 to determine if there is a match. If the determination in step 424 is negative, the program proceeds directly to step 416. However, if the determination in step 424 is affirmative, the program proceeds to step 414 in which the recognized payor name associated with the check is stored in the scalable data warehouse 50. The program then proceeds to step 416 in which a determination is made as to whether there are more checks to be processed. If the determination in step 416 is affirmative, the program returns to step 404 to retrieve binarized image data associated with the next check. Otherwise, the program terminates.

It should be apparent that each of the first and second payor extraction programs 43, 44 processes the binarized image data stored in the check image data archive 20 to provide useful extracted payor data which is eventually stored in the scalable data warehouse 50. Accordingly, the scalable data warehouse 50 stores particular payor data which has been extracted from a number of checks. Again, as previously mentioned, other available data relating to a particular check transaction may also be stored in the check image archive 20.

A bank may use the extracted payor data stored in the scalable data warehouse 50 in many different ways. By knowing who their customers receive checks from, the bank may identify new marketing opportunities with particular customers and provide customized marketing directed to each of the customers depending upon the new marketing opportunities which have been identified. Also, by knowing who their customers receive checks from, the bank is able to provide better services to their customers and is able to identify their major competitors in certain areas.

The bank could also use the extracted payor data stored in the scalable data warehouse 50 to provide innovative types of services to their business customers. For example, a merchant delivering a batch of checks to the bank for processing may wish to know the geographic distribution of the merchant's customers for that day or week. This information is contained in the payor field on each check from the batch of checks and can be extracted and analyzed. The merchant could then use this information to gauge the impact of a marketing campaign which had been carried out earlier. Alternatively, the merchant could use this information to customize ad/flyer campaigns towards certain neighborhoods.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A computerized method of populating a data warehouse, the computerized method comprising the steps of:
   electronically on a microcomputer capturing check image data which is representative of an image of a check having a payor field;
   electronically on a microcomputer processing the captured check image data to determine location of the payor field of the check;
   recognizing text contained in the payor field of the check to establish a payor name in the payor field of the check;
   storing a payor reference list having a plurality of payor names which have been defined by a financial institution based upon a potential interest of the financial institution in the particular payor names;
   comparing the payor name in the payor field of the check with the plurality of payor names in the payor reference list to determine if the payor name in the payor field of the check matches a payor name in the payor reference list; and
   storing the payor name associated with the check in the data warehouse in response to the payor name in the payor field of the check matching a payor name in the payor reference list.

* * * * *